Aug. 26, 1952     H. HÜRLIMANN     2,608,097
RING BALANCE
Filed March 27, 1951

Inventor
Hans Hürlimann
by
Morgan Finnegan and Durham
attorneys.

UNITED STATES PATENT OFFICE 2,608,097

RING BALANCE

Hans Hürlimann, Baar, Switzerland, assignor to Landis & Gyr, A. G., a body corporate of Switzerland Application March 27, 1951, Serial No. 217,797
In Switzerland April 14, 1950

3 Claims. (Cl. 73—405)

The present invention relates to new and useful improvements in ring balances particularly adapted for use as flow meters.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part thereof, illustrate one embodiment of the invention, and together with the description, serve to explain the principles of the invention.

Figure 1:
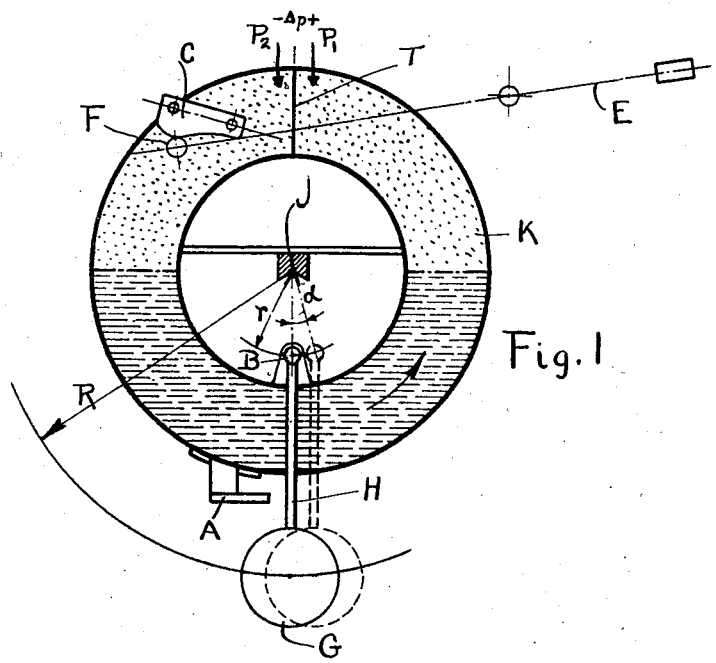
Figure 2:
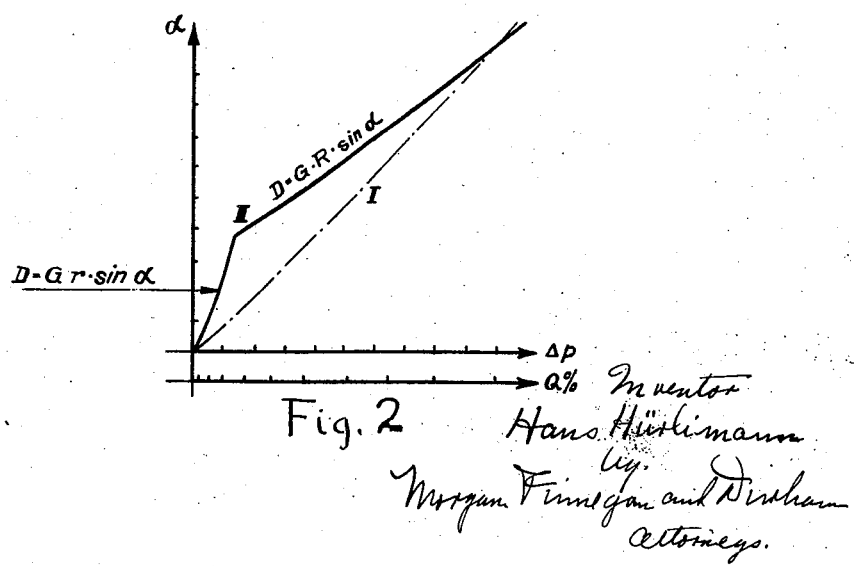

Of the drawings:

Figure 1 is a schematic representation of a typical and illustrative embodiment of the present invention; and Figure 2 is a diagram showing the typical response of such a meter to the various forces measured by it.

The present invention has for its object the provision of a novel and improved ring balance particularly adapted for use as a flow meter to measure the difference in pressure head of a liquid flowing under pressure. A further object is the provision of such a ring balance in which the smaller values measured by the balance result in a greater than normal movement of an indicator over the scale so that these smaller values may be measured with greater accuracy than is usual.

The present invention is in certain respects an improvement upon prior ring balances of the general type disclosed in the prior patent to Laternser No. 2,456,713, December 21, 1948, although in other respects the invention is of more general application.

Heretofore ring balances used as flow meters and operating to measure the difference in head of a liquid flowing under pressure, have been subject to the disadvantage that their indications of relatively small values are compressed within a small portion of the total scale, while the response to larger values, due to the fact that the difference in head is proportional to the square of the current velocity of the fluid being measured, causes these larger values to require an abnormally large portion of the scale, thereby reducing the accuracy of the readings of the scale at the lower values. To overcome this difficulty, various expedients have been proposed such as an increase in the effective pressure service of the ring body and the displacement of the weight of the sealing liquid in the starting region of the ring balance, by attaching a rigid pendulum or counterweight to the lower outside portion of the ring, and also by cam connections between the ring and lever system. All of these arrangements, however, have one or another disadvantage all of which are overcome by the present invention.

According to the present invention there is provided a ring body which is mounted for pivotal movement about its central axis in response to the differences in the fluid pressure head being measured, the lower half of the ring body being filled with a liquid of higher specific gravity while the upper half of the body is filled with a liquid of lower specific gravity, a central partition being provided in the annular ring body to divide the upper portion of the liquid into two bodies of liquid which may be subjected to two different fluid heads so that the ring body is pivotally rocked in accordance with the difference in measured heads.

On the ring body and extending radially downwardly from the pivot is pivotally mounted a counterweight so that as the ring body is rocked, the counterweight is lifted from its zero position in accordance with the rocking movement of the ring body and on the exterior of the ring body is provided a stop member which is adapted to engage with an intermediate portion of the pendulum or counterweight so that the counterweight no longer has its normal pivotal movement and is rigidly fixed to the ring body, thereby converting the pivoted or pendulum-like counterweight into a fixed counterweight after the ring body has been rocked beyond a predetermined angle.

Thereby the effect of the counterweight in restraining rocking motion of the ring body, under pressure of increasing heads, is increased. In order to further vary the scale indication produced by an indicating pointer in response to rocking movement of the ring body, the pivoted pointer adapted to move over a calibrated scale is drivingly connected with the ring body by means of a curved cam surface which cooperates with a roller on the hand of the pointer, the cam being carried by the ring body.

It will be understood that the foregoing general description and the following detailed description as well are exemplary and explanatory of the invention but are not restrictive thereof.

Referring now in detail to the present preferred and illustrative embodiment of the invention as shown in Figure 1 of the drawings, the ring body K of the ring balance comprises a hollow annular tube which is divided at its uppermost portion by means of a radial wall or partition T, and is adapted to be connected by means of suitable flexible tubing to the two sources of pressure P-1 and P-2 whose difference is to be measured by the ring balance, this difference in pressure causing the ring body K to rock about a central pivot J, as the heavier liquid filling the lower half of the ring body is displaced by the different pressures applied to the two bodies of lighter liquid in the upper half of the ring body K. Below the pivot J, and mounted on the ring body K, preferably at its inner circumference, is a pivot member B, from which downwardly extends a pendulum rod H and the attached pendulum-like counterweight G, the rod H in the zero position of the ring body extending radially downward from the pivot point J.

Also mounted on the ring body is cam member C having an evolute surface which coacts with a roller F mounted on an end of a pivoted pointer E which is adapted to move over a calibrated scale (not shown) so as to indicate the displacement of the ring body from its normal or zero position in which it is normally held by the weight of the pendulum-like counterweight G.

On the exterior of the ring body, and slightly to one side of the normal position of the pendulum rod H is mounted a stop member A which engages with the pendulum rod H as the ring body has been pivotally rocked through a predetermined angle in response to a predetermined difference in the pressure heads being measured. After the stop member A has engaged the pendulum rod H, the counterweight G becomes a rigid part of the pivoted system and thereafter exercises its full restraining influence on further rocking movement of the ring body K.

In the diagram of Figure 1, the angle through which the ring body is rocked is indicated by $a$, the radial distance between the pivot point J and the pendulum pivot B is indicated by $r$, while the radial distance between the pivot point J and the center of mass of the counterweight G after its engagement with the stop A is indicated by the letter R. When the ring body K begins to rotate under the pressure head differential, as measured by the two pressures applied to the opposite sides of the partition T, the resistance to the rocking movement of the ring body may be expressed by the equation $$D = G \cdot r \cdot \sin a$$

After the ring body K has rocked sufficiently to cause the stop member A to engage the pendulum supporting rod H thereby converting the pendulum and ring body into a rigid structure, the resistance caused by the counterweight to further rocking movement of the ring body is expressed by the equation $D = G \cdot r \cdot \sin a$.

Figure 2 of the drawings shows the curve I expressing the values of the angle $a$ as plotted against changes in the pressure differential $\Delta p$ or as percentages of the full scale reading where the present invention is not employed and with the counterweight forming a permanent rigid member connected to the ring body K. Curve II shows the rotation of the ring balance plotted against the same values, where the improvements of the present invention are employed. The steeply inclined portion of the curve represents the initial pivotal movement of the ring body K where the counterweight G is being lifted on a short radius, while the portion of the curve of lesser slope and corresponding to the higher values of angular movement and pressure difference correspond to that portion of the ring body movement in which the counterweight is being lifted about its longer radius.

The invention in its broader aspects is not limited to the specific mechanisms shown and described but departures may be made therefrom within the scope of the accompanying claims without departing from the principles of the invention and without sacrificing its chief advantages.

What is claimed is:

1. A ring balance including in combination a ring body mounted for pivotal movement about a center, a pendulum-like counterweight pivotally mounted on the ring body below the ring body pivot when the ring body is in zero position and adapted to be lifted as the ring body moves from its zero position and a stop on the ring body adapted to engage the counterweight on further pivotal movement of the ring body so that the ring body and counterweight then move together as a rigid structure.

2. A ring balance as claimed in claim 1 in which the ring body carries a curved cam surface cooperating with a pivoted member moved thereby to indicate the pressure differential as measured by the ring balance.

3. A ring balance as claimed in claim 1 in which the counterweight pivot is mounted on the ring body and the pendulum is radially alined with the ring body center when the ring body is in zero position, while the stop is positioned on the ring body to one side of the pendulum to engage and bodily move the pendulum after the ring body pivots slightly about its center.

HANS HÜRLIMANN.

REFERENCES CITED

The following references are of record in the file of this patent:

UNITED STATES PATENTS

| Number | Name | Date |
|---|---|---|
| 2,331,153 | Ackley | Oct. 5, 1943 |

FOREIGN PATENTS

| Number | Country | Date |
|---|---|---|
| 365,949 | Great Britain | Apr. 1, 1931 |